United States Patent [19]
Jensen

[11] Patent Number: 5,630,447
[45] Date of Patent: May 20, 1997

[54] PIPE FOR GEOTHERMAL HEATING AND COOLING SYSTEMS

[75] Inventor: Robert C. B. Jensen, River Vale, N.J.

[73] Assignee: Endot Industries, Inc., Rockaway, N.J.

[21] Appl. No.: 543,291

[22] Filed: Oct. 6, 1995

[51] Int. Cl.$^6$ ..................................................... F16L 9/18
[52] U.S. Cl. ........................... 138/115; 138/111; 138/117
[58] Field of Search ........................... 138/111, 114–117, 138/32, 33; 137/340, 341

[56] References Cited

U.S. PATENT DOCUMENTS

| | | | |
|---|---|---|---|
| 2,482,335 | 9/1949 | Fleitz | 138/116 |
| 3,537,485 | 11/1970 | March | 138/115 |
| 3,548,863 | 12/1970 | Stippich | 137/340 |
| 4,091,261 | 5/1978 | Noland | 138/116 X |
| 4,218,607 | 8/1980 | Noland | 138/116 X |
| 4,741,255 | 5/1988 | Lancaster | 138/117 X |

*Primary Examiner*—David Scherbel
*Assistant Examiner*—Patrick F. Brinson
*Attorney, Agent, or Firm*—Robert S. Smith

[57] ABSTRACT

A conduit for use in a geothermal heating and cooling system which includes an elongated tubular member having first and second ends, the member having an outer surface. A longitudinally extending divider wall is disposed within the tubular member. The divider wall divides the interior of the tubular member into first and second fluid flow passageways extending longitudinally within the tubular member. The apparatus further includes a cup shaped member disposed on the second end of the elongated tubular member. The cup shaped member directs all fluid flow in the first fluid flow passageway from the first end to the second end into the second end of the second fluid flow passageway. Other forms of the invention have first and second elongated tubular members that have first and second ends and each of the tubular members has an outer surface. Each of the elongated tubular members may have a transverse cross-section having (1) an arcuate wall having a radius R and (2) a generally planar wall joined to the arcuate wall. A cup shaped member is disposed on the second end of the elongated tubular member. The cup shaped member directs all fluid flow in the first fluid flow passageway from the second end thereof into the second end of the second fluid flow passageway.

11 Claims, 2 Drawing Sheets

5,630,447

PIPE FOR GEOTHERMAL HEATING AND COOLING SYSTEMS

BACKGROUND OF THE INVENTION

The present invention relates to plastic pipe and pipe assemblies for use an geothermal heating and cooling systems. The invention has particular application to vertical geothermal systems, although it may also be used an horizontal systems. In addition the present invention has primary application to closed loop systems although the same pipe may also be used in open loop systems.

The earth has the ability to absorb and store heat energy. The geothermal heat pump system may thus extract heat from the earth through a liquid medium such as groundwater or an anti-freeze solution. The extracted heat may be used to heat a building. Conversely, heat may be extracted from a building and transferred to the earth. When changing from heating to cooling, or cooling to heating, the direction of fluid flow is reversed.

Geothermal heat pumps are increasingly being used to heat and cool both residential and commercial buildings. Such systems use this natural heat storage ability of the earth and/or the earth's groundwater to heat and cool. All heat pumps take heat from a first location and move that heat to a second location. In some cases, the temperature at the first location is lower than at the second location. Refrigerators and air conditioners are heat pumps which remove heat from colder interior spaces to warmer exterior spaces for cooling purposes. Heat pumps can move heat from a low temperature source to a high temperature space for heating. The movement of heat is accomplished with a vapor cycle that includes sequential evaporation, compression, condensation, and expansion. A refrigerant is used as the heat transfer medium and that medium circulates within the heat pump system.

There are two main types of loops: open and closed. A typical open-loop systems consumes water from a well. Closed loop systems use a continuous loop of plastic pipe buried in the earth. An anti-freeze solution circulates within the closed loop. The term anti-freeze is used herein to refer to the circulating fluid. Those skilled in the art will recognize that in climates in which no temperatures below the freezing temperature of water are known, the circulating fluid will typically be water. In those areas where temperatures fall below the freezing temperature of water the circulating fluid will be an anti-freeze solution such as an ethylene glycol solution. For convenience, the term antifreeze is used herein.

Horizontal loop systems typically have the loop disposed in a horizontal plane within a trench. Vertical loops in prior art systems have typically been used with substantially vertical shaft wells extending to the water table. A typical loop comprises first and second elongated straight legs that are each in fluid communication with a U-shaped section of pipe. Because such pipe has inherent limitations on the minimum radius of curvature that is possible without damaging the wall of the pipe, such structures inherently require a relatively large well bore to accommodate the loop. Because the cost of drilling the well rises geometrically with increases in well bore diameter this conventional prior art approach is not satisfactory. This prior art approach is also unsatisfactory because the part of the total surface area of two straight elongated tubes that is available for heat transfer is relatively limited.

Still another problem with the prior art structure that uses two elongated tubes joined at the lower extremity by an U-shaped pipe section is that this arrangement does not efficiently use the envelope of the well bore. It will be understood that, since wells are typically bored by a rotating tool, the well bore will ordinarily have a circular cross-section. Because the cross-section, taken in a horizontal plane, of the prior art construction will approximate the shape of the numeral "8" it follows that portions of the prior art structure will be relatively closely spaced to the wall of the well bore and other portions will be relatively widely spaced from the wall of the well bore.

SUMMARY OF THE INVENTION

It is an overall object of the invention to provide apparatus which will reduce the cost of installation, reduce the cost of manufacture, and reduce the cost of operation of the system in which the apparatus is installed.

More specifically, it is an object of the invention to reduce the costs of installation by making the overall tube cross-section as small as possible and also by making the overall tube cross-section be substantially circular so that the pipe will maximize utilization of the center cross-section well bore.

Another object of the invention is to provide apparatus that will allow maximum fluid flow inside the pipe that has a circular envelope.

Still another object of the invention is to provide apparatus that can be manufactured with a minimum amount of plastic resin material for a given flow requirement. In other words, it is an object of the invention to provide an apparatus that will allow essentially the same flow as the prior art structure that uses two spaced tubes and which will require less resin material, will have a smaller overall cross-sectional envelope, and will have an overall cross-sectional envelope that is substantially circular.

Yet another object of the invention is to provide apparatus that can be manufactured using conventional extrusion process methods.

Still another object of the invention is to provide apparatus that will provide relatively good thermal isolation between the respective flow passages within the apparatus.

It has now been found that these and other objects of the invention may be attained in a conduit for use in a geothermal heating and cooling system which includes an elongated tubular member having first and second ends, the member having an outer surface. A longitudinally extending divider wall is disposed within the tubular member. The divider wall divides the interior of the tubular member into first and second fluid flow passageways extending longitudinally within the tubular member. The apparatus further includes a cup shaped member disposed on the second end of the elongated tubular member. The cup shaped member directs all fluid flow in the first fluid flow passageway from the first end to the second end into the second end of the second fluid flow passageway.

In some forms of the invention the tubular member has a cross-section that is substantially circular and the cup shaped member cooperates with the outer surface of the generally tubular member. The divider wall and the tubular member are manufactured of a plastic resin material in some embodiments.

Other forms of the invention have first and second elongated tubular members that have first and second ends and each of the tubular members has an outer surface. Each of the elongated tubular members may have a transverse cross-section having (1) an arcuate wall having a radius R and (2) a generally planar wall joined to the arcuate wall. A cup shaped member is disposed on the second end of the elongated tubular member. The cup shaped member directs all fluid flow in the first fluid flow passageway from the second end thereof into the second end of the second fluid flow passageway.

In some forms of the invention each of the arcuate walls has an angular extent of 180 degrees and first and second elongated edges. The planar wall may have a width of 2R and the planar wall is elongated and has first and second elongated edges that are respectively fixed to the first and second edges of the arcuate wall.

In some forms of the invention each of the elongated tubular members is manufactured of a plastic resin material. The cup shaped member may cooperate with the arcuate walls of the first and second elongated tubular members.

BRIEF DESCRIPTION OF THE DRAWING

The invention will be better understood by reference to the accompanying drawing in which.

DESCRIPTION OF THE PREFERRED EMBODIMENT

Figure 1:
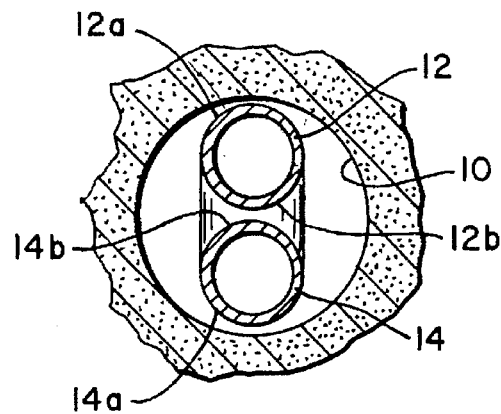
FIG. 1 is a cross-section view taken through a horizontal plane of the prior art vertical loop construction.

Referring now to FIG. 1, there is shown a schematic representation of a well bore 10 in which are disposed a first cylindrical pipe 12 for conducting water into the well bore 10 and a second cylindrical pipe 14 for conducting the same water out of the well bore 10. It will be understood that the view is a cross-section view taken in a horizontal plane. This cross-section is representative of a prior art construction having a U-shaped tube at the lower axial extremity to couple the first cylindrical pipe 12 to the second cylindrical pipe 14.

The tube 12 has an outer axially extending portion 12a and an inner axially extending portion 12b. Similarly, the tube 14 has an outer axially extending portion 14a and an inner axially extending portion 14b. In a typical system one tube, such as tube 12, will convey a relatively hot anti-freeze solution downwardly into a region where the water table will surround the tube 12. A U-shaped tube (not shown) joins the lower axial extremity of the tube 12 tube to the lower axial extremity of the tube 14. Accordingly, the anti-freeze solution will be forced upwardly in the tube 14. Because of the surrounding relatively cold water table the anti-freeze solution will become progressively cooler as it flows through the axial extent of the tube 12, the U-shaped tube, and the tube 14. It will thus be understood that the water table temperature is colder than the temperature in the tube 14 and that temperature will be lower than the temperature of the solution in tube 12. Because of the relatively low temperature gradient between the solution in tube 12 and the solution in tube 14 the heat transfer between the water table and the portions 12b, 14b will be much less than the heat transfer between the water table and the portions 12a, 14a.

The limited circumferential extent of the major heat transfer in this prior art structure is only one unsatisfactory aspect of the prior art apparatus. Another disadvantage in the illustrated prior art apparatus is poor utilization of the envelope of the well bore 10. This will best be understood by comparison to the embodiments of FIGS. 2 and 3. A typical prior art embodiment of the type illustrated in FIG. 1 comprises a tube 12 having a one inch outside diameter and a tube 14 having a one inch diameter. Because the tubes 12, 14 will have some spacing therebetween the diameter of the well bore in which the tubes 12, 14 are disposed must be greater than 2.1 inches in diameter. It will be understood that the typical well bore is produced by a rotating tool. Accordingly, the well bore has a cylindrical contour. It will be further understood that the volume of earth that must be removed to produce the well bore 10 is a function of the square of the radius of the well bore. Thus, the cost of drilling the well increases exponentially with increasing well bore sizes. In other words, it is desirable tube minimized the size of the cross-section envelope of the tubes so that the size of the well bore may be minimized.

Figure 2:
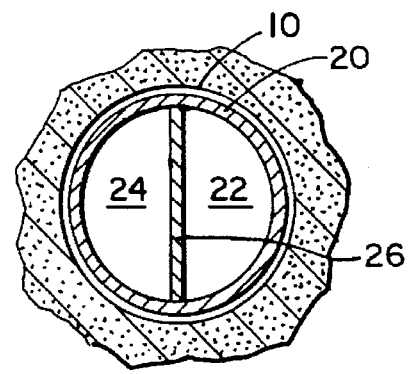
FIG. 2 is a cross-section view taken through a horizontal plane of the apparatus in accordance with a first form of the present invention.
Figure 4:
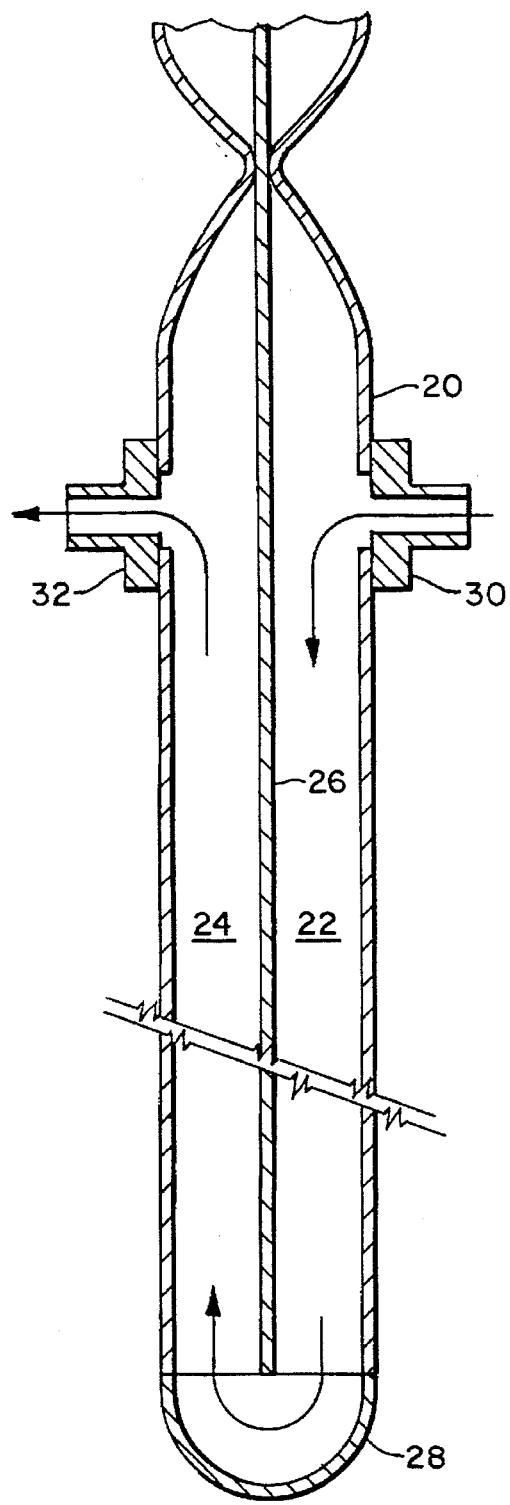
FIG. 4 is a cross-section view taken through a vertical plane of the apparatus shown in FIG. 2.

Referring now to FIGS. 2 and 4 where is shown a dual cell pipe 20 having a diametrically disposed wall 26 that extends throughout the entire axial extent of the pipe 20. The wall 26 bisects the pipe 20 into two independent axially extending cells 22 and 24. In a typical embodiment the diameter of the pipe 20 is 1.48 inches. The thickness of the wall 26 ordinarily will be relatively thin. Accordingly, the cross-sectional area of each of the cells is substantially equal to the cross-sectional area of the pipes 12, 14 described in the FIG. 1 prior art structure. It will thus be seen that the embodiment of the invention illustrated in FIGS. 2 and 4 provides essentially the same cross-sectional area as the to prior part embodiment illustrated in FIG. 1.

As best shown in FIG. 4 a cap 28 to engages the lower axial extremities of both the cell 22 and cell 24. Because of the cross section of the pipe 20 shown in FIG. 2 the cap 28 is a spherical section. Preferably, the fittings 30, 32 for connection to other apparatus in the heat pump system are secured to the wall of the pipe 20 by a saddle fusion process. the upper axial extremity of the pipe will ordinarily be accomplished by to a spacing off or pinching off process that is accomplished plane the to pipe 20 is hot.

It will thus be seen to that the invention provides a structure will have a lower manufacturing cost, in part, because of the need for less plastic resin material to manufacture the pipe. It will also be seen that the cost of drilling the well will be reduced because the diameter will be smaller than in prior art structures. It will also be seen that the well often may be more shallow than prior art systems require because of the greater efficiency, due to to the contour. An additional economic advantage is that the cost of operation of systems incorporating the present invention will be lower than in prior art systems.

Figure 3:
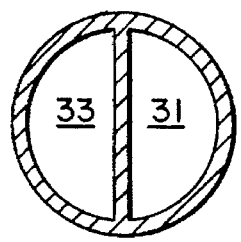
FIG. 3 is a cross-section view taken through a horizontal plane of the apparatus in accordance with a second form of the present invention.

In the second embodiment illustrated in FIG. 3 the structure is similar except that axial sections include two discrete axially extending cells 30, 32. The lower axial extremity thereof will also engage a cap 28.

Figure 6:
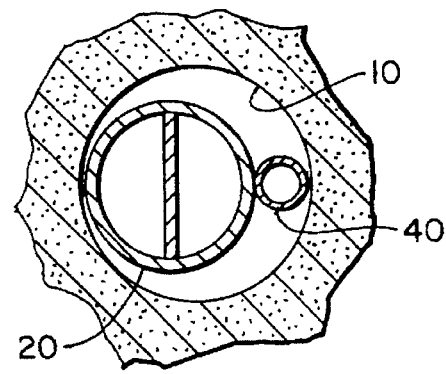
FIG. 6 is a cross-section you taken through a horizontal plane of the embodiment of FIGS. 2 and 4 installed in a well bore with a grouting pipe in side abutting relationship.

Referring now to FIG. 6 their is shown another manner in which the embodiments of FIGS. 2 and 3 may be utilized. It is the practice, at least for some installers of geothermal systems, to install a grouting pipe 40. Such pipes are used to force grouting into the well bore end. The prior art construction typically provides three substantially parallel pipes extending into the well bore. One approach to grouting of apparatus such as that shown in FIGS. 2 and 3 is to insert a grouting pipe 40 in side abutting relationship to the dual cell pipe 20. This construction is shown in FIG. 6.

Figure 7:
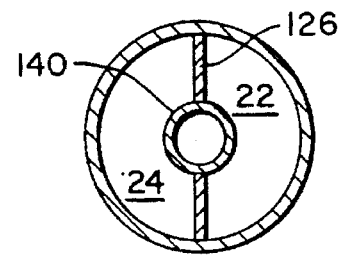
FIG. 7 is a cross-section view taken through a horizontal plane of another embodiment having an integral grouting pipe.
Figure 8:
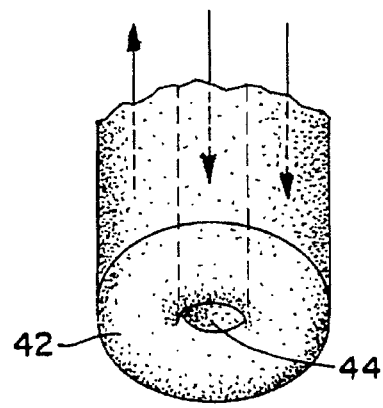
FIG. 8 is a perspective view of a donut shaped cap for directing liquid flow passing downwardly in one cell into a second cell for upward passage in the embodiment of illustrated in FIG. 7.

A third embodiment of the present invention is shown in FIGS. 7 and 8 in which cells 24 and 22 are substantially the same as in FIGS. 2 and 4. Unlike that embodiment, however, the divider wall 126 is constructed with a central grouting pipe 140 with radially extending coplanar planar portions that diametrically divide the passageway. Although the divider wall 126 has been illustrated as a single wall other embodiments may have spaced planar wall elements such as that shown in FIG. 5. The embodiment of FIG. 7 is particularly advantageous in that the grouting pipe 140 is positioned to provide better thermal isolation between the cell 22 and the cell 24 while still providing the advantages of a large proportion of the total surface area being effective heat transfer surface and also effectively utilizing the available wall bore 10 envelope.

FIG. 8 illustrates toroidal section shaped end cap that directs the flow from the cell 22 to the cell 24 (or vice versa). It will be understood that the term "torus" or "toroidal" refers to a donut shape and the term "toroidal section" refers to a part of a complete torus. In the illustrated embodiment the interface 42 of the toroidal section with the outer tube and the interface 44 of the toroidal section with the inner tube.

In the embodiment of FIGS. 2 and 4 a spherical section cap 28 redirects anti-freeze flowing downwardly in one cell to pass upwardly in the other cell. The embodiment of FIG. 7 requires a different member at the lower extremity of the cells. More specifically, a member 42 having substantially the contour of one half of a hollow donut is required. In this context the one half of a hollow donut refers to a part of a donut that is bisected by a plane so that each half is ring shaped. This contour allows flow of grouting through the opening 44. Those skilled in the art will recognize that other forms of the invention may use other conduit shapes for the grouting material. For example, two spaced apart planar walls such as those shown in FIG. 5 would allow passage of grouting material therebetween while providing excellent thermal isolation between the respective cells. Such embodiments will require some reconfiguration of the member 42 and the opening 44 therein.

The dual cell pipe 20 is advantageous (1) because it provides the same cross-sectional flow area in a structure that will fit in a smaller diameter well bore and (2) because it maximizes the proportion of the total circumferential area of the cell that is disposed on the outer circumferential parts corresponding to the portions 12a and 14a. More specifically, inspection of FIG. 2 and FIG. 1 will make evident that the cylindrical section shaped portion of the wall of the cell 22 has a much greater surface area than the surface area of the wall 26. It will thus be seen the invention allows the use of a much smaller well bore diameter while providing a surface contour that maximizes heat transfer.

Figure 5:
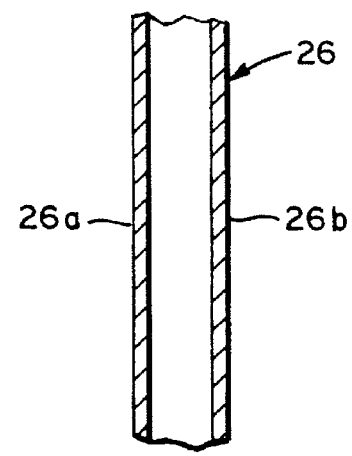
FIG. 5 is a partial sectional view of spaced discrete walls that separate the cells in one form of the FIG. 2 embodiment.

It will be understood that in some embodiments the wall 26 may comprise two discrete walls separated by spacing members or honey comb to provide an air space for better thermal isolation. The manufacturing process for such embodiments may include simultaneously extruding layers of plastic material on the opposite faces of a preformed honeycomb element. A process of this type is described in U.S. Pat. No. 5,047,193. FIG. 5 is a partial sectional view of spaced discrete walls 26a and 26b in one such embodiment. The preferred pipe material for is either polyethylene or polybutylene.

The invention has been described with reference to its illustrated preferred embodiment. Persons skilled in the art of such devices may upon exposure to the teachings herein, conceive other variations. Such variations are deemed to be encompassed by the disclosure, the invention being delimited only by the following claims.

Having thus described my invention I claim:

1. A conduit for use in a geothermal heating and cooling system which comprises:

an elongated first tubular member having first and second ends, said elongated first tubular member having an inner and an outer surfaces;

an elongated second tubular member having first and second ends, said elongated second tubular member having an inner and an outer surfaces, said second tubular member being disposed within said first tubular member;

a first longitudinally extending divider wall disposed within said first tubular member, said first longitudinally extending divider wall extending from said first tubular member to said second tubular;

a second longitudinally extending divider wall disposed within said first tubular member, said second longitudinally extending divider wall extending from said first tubular member to said second tubular; said first and second longitudinally extending members dividing the annular space intermediate said first and second tubular members into first and second fluid flow passageways extending longitudinally; and a toroidal section shaped member engaging said second end of said first tubular member and said second end of said second tubular member whereby said first and second fluid flow passageways are in fluid communication and said second and of said second tubular member is unobstructed.

2. The apparatus as described in claim 1 wherein:

said second tubular member is circular in cross-section.

3. The apparatus as described in claim 2 wherein:

said first tubular member is circular in cross-section.

4. The apparatus as described in claim 3 wherein:

said first and second tubular members are substantially coaxial.

5. The apparatus as described in claim 4, wherein:

said first and second longitudinally extending divider walls are planar.

6. The apparatus as described in claim 4 wherein:

said first and second longitudinally extending divider walls are each radially disposed.

7. The apparatus as described in claim 6 wherein:

said first and second longitudinally extending divider walls are coplanar.

8. The apparatus as described in claim 7 wherein:

said first and second longitudinally extending divider walls are coincident with a diameter of said first tubular member.

9. The apparatus as described in claim 8 wherein:
said apparatus is manufactured of a plastic resin material.
10. The apparatus as described in claim 9 wherein:
first longitudinally extending divider wall is a double wall having two spaced planar wall elements.

11. The apparatus as described in claim 10, wherein:
second longitudinally extending divider wall is a double wall having two spaced planar wall elements.

* * * * *